United States Patent [19]

Schmid et al.

[11] 4,181,508

[45] Jan. 1, 1980

[54] METHOD AND APPARATUS FOR SEPARATING DESUBLIMATABLE COMPONENTS FROM GAS MIXTURES

[75] Inventors: Jurgen Schmid, Stutensee-Friedrichstal; Rolf Schutte, Karlsruhe; Harald Steinhaus, Eggenstein, all of Fed. Rep. of Germany

[73] Assignee: Gesellschaft fur Kernforschung m.b.H., Karlsruhe, Fed. Rep. of Germany

[21] Appl. No.: 856,193

[22] Filed: Nov. 30, 1977

[30] Foreign Application Priority Data

Nov. 30, 1976 [DE] Fed. Rep. of Germany ....... 2654249

[51] Int. Cl.² .............................................. B01D 59/08
[52] U.S. Cl. ......................................... 55/82; 55/209; 55/269; 62/14; 165/61; 165/141
[58] Field of Search .................. 55/66, 71, 80, 81, 82, 55/208, 209, 269, 17; 62/12–14; 23/294 R; 423/19; 165/61, 140, 141

[56] References Cited

U.S. PATENT DOCUMENTS

| 1,980,791 | 11/1934 | Duggan et al. ............................ 55/269 |
| 3,024,009 | 3/1962 | Booth, Jr. et al. ................. 23/294 R |
| 3,084,914 | 4/1963 | Davis .......................................... 55/82 |
| 3,097,940 | 7/1963 | Houston ..................................... 62/12 |
| 3,271,934 | 9/1966 | Shields ..................................... 55/269 |
| 3,670,522 | 6/1972 | Bresin ...................................... 165/140 |
| 4,002,198 | 1/1977 | Wagner et al. ........................ 165/61 |

FOREIGN PATENT DOCUMENTS

| 1065397 | 9/1959 | Fed. Rep. of Germany .............. 55/71 |
| 2247229 | 3/1974 | Fed. Rep. of Germany .............. 55/80 |
| 433916 | 11/1907 | U.S.S.R. ................................... 55/209 |

*Primary Examiner*—David L. Lacey
*Attorney, Agent, or Firm*—Spencer & Kaye

[57] ABSTRACT

Method for separating a desublimatable component from a gas mixture onto the surface of a heat exchanger apparatus having a heat exchanger separator containing a cold end and a warmer end, comprises flowing the gas mixture through the separator from the warmer end toward the cold end and providing a nonstationary temperature distribution in the heat exchanger separator to shift the position of the dew point at a controlled speed from a given point near or at the cold end of the heat exchanger separator at the beginning of the separation process to the warmer end of the separator to produce a desired layer thickness profile of desublimate on the surface of the heat exchanger separator in a direction opposite the direction of flow of the gas mixture. An apparatus is provided for practicing the method.

39 Claims, 9 Drawing Figures

METHOD AND APPARATUS FOR SEPARATING DESUBLIMATABLE COMPONENTS FROM GAS MIXTURES

BACKGROUND OF THE INVENTION

The present invention relates to a method, and apparatus for practicing the method, for separating desublimatable components from gas mixtures on the surfaces of a heat exchanger apparatus.

The desublimation of such components is of significance, for example, in $UF_6$ separation systems for separation nozzle cascades in which the $UF_6$ (uranium hexafluoride) contained in inert gas streams of high intensity must be separated, in some cases, until a final concentration of less than 1 ppm has been attained.

Due to the vapor pressure curve of $UF_6$, a final temperature of about $-120°$ C. is required for the desublimation of $UF_6$ at operating pressures of about 1 atmosphere absolute. Countercurrent systems will be used in order to keep the costs involved in obtaining the required low temperatures for the high-intensity inert gas stream to be processed within economical limits. Such a low temperature separator system operates in a discontinuous manner because when the separator becomes charged, it must be emptied by cutting off the process stream. During the emptying operation, the separator system is heated and thus is available for further separating operation only after it has again been cooled to the required final temperature. It is therefore important for economical separator operation (and with as few reactive effects as possible on the operation of the processes which furnish the gas mixture, e.g. an enrichment cascade), that the pressure drop at the separator does not only have a low absolute value, but that the relative change in the pressure drop during switching from a charged to an empty separator be as small as possible and that nevertheless the separator efficiency be as high as possible.

Methods and apparatus are known to cool gases, such as disclosed in German Auslegeschriften No. 10 03 240 and No. 10 37 489, but with the known methods and apparatus it is neither possible to obtain uniform layer formation of desublimatable components on separator surfaces nor a constant low pressure drop at a constant final temperature.

SUMMARY OF THE INVENTION

It is therefore a primary object of the present invention to provide a separating method which makes it possible to operate with a very slight and simultaneously constant (in time) pressure drop and still charge a significant fraction of the separator volume with the desublimating component of the gas mixture while at the same time, for economic reasons, not bringing the lowest temperature impressed on the gas stream to be processed to a value lower than what is absolutely required, in view of the vapor pressure curve of the desublimating component, to obtain the desired degree of separation.

A further object of the present invention is to provide an apparatus for performing the separating method.

Additional objects and advantages of the present invention will be set forth in part in the description which follows and in part will be obvious from the description or can be learned in practice of the invention. The objects and advantages are achieved by means of the processes, instrumentalities and combinations particularly pointed out in the appended claims.

To achieve the foregoing objects and in accordance with its purpose, the present invention provides a method for separating a desublimatable component from a gas mixture onto the surface of a heat exchanger apparatus having a heat exchanger separator containing a cold end and a warmer end, comprising: flowing the gas mixture through the separator from the warmer end toward the cold end to produce a desired layer thickness profile of desublimate on the surface of the heat exchanger separator in a direction opposite the direction of flow of the gas mixture by means of a nonstationary temperature distribution in the heat exchanger separator to shift the position of the dew point at a controlled speed from a given point near or at the cold end of the heat exchanger separator at the beginning of the separation process to the warmer end of the separator.

In the process of the present invention, by removing the desublimatable component from the gas mixture, a "pure" gas is formed which is a cooled inert gas that emerges from the separator passage and which then passes through a pure gas passage thermally associated with the separator passage where it is reheated to its starting temperature. Between passage from the separator passage to the pure gas passage, the gas passes through a final cooler region in which supersaturation produced in the separator passage can be eleminated.

In the present invention, the gas mixture to be submitted to the separation process enters the heat exchanger at a temperature $T_1$ and a pressure $P_1$. At the end of the separator passage, the gas, from which the major portion of the desublimatable component has been removed, has a temperature $T_2$ and a pressure $P_2$. The gas passes through the final cooler passage and emerges from it at a temperature $T_3$ and a pressure $P_3$. The gas then passes through the pure gas passage where it is reheated and leaves the heat exchanger at a temperature $T_4$ and a pressure $P_4$. The separator passage and the pure gas passage are paralleled by and thermally associated with auxiliary passages in which a flow of a suitably chosen heat transfer medium provides a controlled amount of additional cooling energy in order to create the specified nonstationary temperature profile within the exchanger separator block.

The initial temperature profile used at the start of the separation process can be obtained either by a direct cooling process where the final cooling passage is cooled without any process gas flowing across the separator by direct metallic heat conduction from a crosscurrent heat exchanger which is integrated in the separator block or by an indirect cooling process wherein a separately arranged final cooler is used and cooling energy is transferred to the separator by a flow of inert process gas.

The apparatus of the present invention for separating a desublimatable component from a gas mixture containing inert gas is a countercurrent heat exchanger which comprises: a raw gas separator passage in which the condensable component of the gas mixture desublimates; a pure gas passage in which cooled inert gas which emerges from the separator passage is reheated to its starting temperature, the pure gas passage being thermally associated with the raw gas separator passage; an auxiliary passage through which flows an auxiliary stream and which is thermally connected to the raw gas passage and the pure gas passage; a final cooler passage connecting the separator passage and pure gas passage, and in which it is possible to reduce supersaturation produced in the separator passage; and a filter downstream of the separator passage, and in which crystallites of the desublimate which may be carried along by the gas stream are collected.

Generally, the heat exchange apparatus contains a precooling portion before the separator passage and the process gas enters the heat exchanger in the precooling portion. The precooling portion of the apparatus further includes that portion of the apparatus where the reheated pure gas leaves the heat exchanger. The precooling portion may form part of a heat exchanger separator block.

The particular advantages of the present invention are therefore that a countercurrent separator system is formed with which it is possible to operate with a temperature profile moving in but one direction, the dew point of the condensable component being shifted in a controlled manner from the cold to the warmer end. Preferably, this shift of the dew point is obtained by means of a controlled additional or auxiliary cooling stream. The present invention achieves a practically fixed final separator temperature and even simultaneously achieves a uniform layer formation of the desublimating component (e.g. $UF_6$) in the separator passage. At the beginning of the separation process, the separator preferably is operated with a very steep temperature gradient at the cold end so that it operates with high driving temperature differences. Then the initially possibly-occurring supersaturation of the component (e.g. $UF_6$) in the pure gas can be reduced to no measurable traces (e.g. less than 0.1 ppm for $UF_6$) in the final cooler region of the separator in a flow region having extremely short diffusion paths. By controlling the speed of travel of the dew point the buildup of the layer of the desublimatable component ($UF_6$) can be controlled so that the desublimatable component produces a uniform cross-sectional covering on 70-80% on the free cross section of the separator passage and the thereoccurring slight increase in pressure loss is compensated in the other parts of the separator apparatus as a result of changes in density and viscosity with decreasing temperature to such an extent that the pressure drop in the total system during the charging process remains practically constant.

The separation method according to the present invention has been performed with mixtures of hydrogen and uranium hexafluoride using light metal heat exchanger blocks with a cross section of 88 cm by 15 cm. The separator portion of 108 cm length contained several separator passages of 11.8 mm high, completely finned with 0.2 mm serrated fins of 3 mm length in the direction of flow, spacing was 10 fins per inch. The pure gas passages, the auxiliary passages and also the raw gas passages in the precooler portion of 56 cm length had a height of 6 mm, completely provided with non-corrugated fins having a spacing of 10 fins per inch. This heat exchanger separator system was equipped with separate final cooler and separate filter.

With this separator system, raw gas mixtures containing 0.5 to 0.1% of $UF_6$ in hydrogen have been successfully processed with flow rates in the range of 100 to 1100 m$^3$/hour at process gas pressures of 90 to 350 mm of mercury (Hg), the desublimation rate being varied from 3 to 15 kg $UF_6$/hour. For one representative separation operation including 60 minutes of initial cooling period and 5 hours of separation period, the measured temperature profiles and the measured pressure profiles are given in the FIGS. 1, 2 and 3. From these measured values, the layer profiles of the desublimated $UF_6$ represented in FIG. 1c have been calculated. During this separation operation a total of 50 kg of $UF_6$ has been deposed in the separator from a flowrate of raw gas of 9.5 kMoles/hour containing 0.3% of $UF_6$ at a pressure of 150 mm Hg absolute.

The residual content of $UF_6$ in the processed pure gas stream in the separation operations performed with the described apparatus was lower than the detection limit of 0.1 ppm of the infrared gas analyzer system connected to the pure gas duct.

BRIEF DESCRIPTION OF THE DRAWINGS

The accompanying drawings, in which like numbers indicate like parts, illustrate examples of presently preferred embodiments of the invention and, together with the description, serve to explain the principles of the invention.

FIG. 1b shows the corresponding time sequence of the resulting pressure drop $\Delta P_A = P_1 - P_2$ as a function of the separator length L, for the embodiment of FIG. 1a.

Figure 1A:
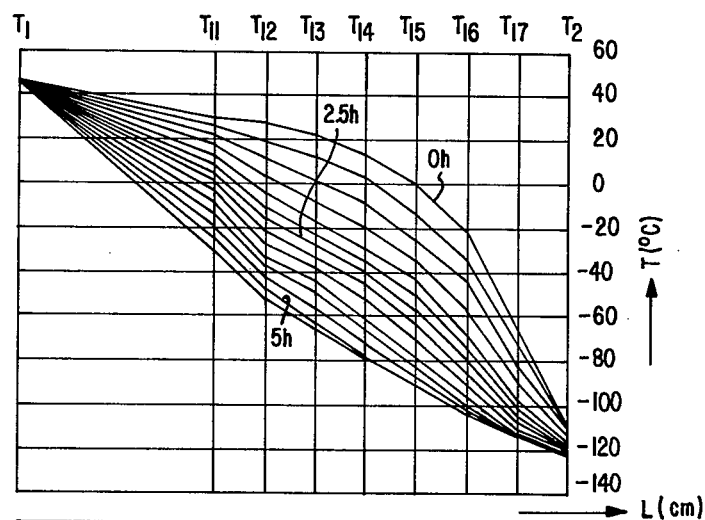
FIG. 1a shows the temperature profile (separator temperature T) as a function of the separator length L at various times during a typical separation process performed according to the teachings of the present invention, including the temperature profile at 0 hours, 2.5 hours, and 5 hours.
Figure 1B:
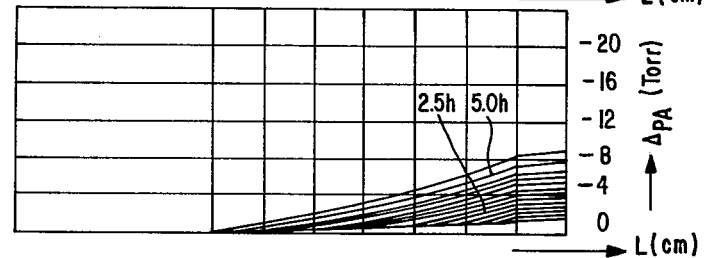
Figure 1C:
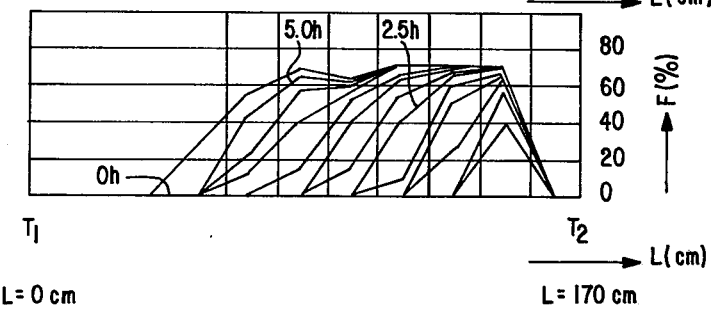
FIG. 1c shows the corresponding time sequence of the coverage of the surface of the free separator cross section F at every point in the separator passage, which has the temperature $T_1$ at the warmer end and the temperature $T_2$ at the cold end, intermediate points of temperature measurements being numbered $T_{11} \ldots T_{17}$.

The values measured for the pressure drop and the charges in FIGS. 1a, 1b, and 1c apply to a specific separator charge of 135 kg $UF_6$/h and 15,000 m$^3$ of gas mixture/h per m$^2$ cross section of the separator passage at an average gas pressure of 170 Torr.

Figure 2A:
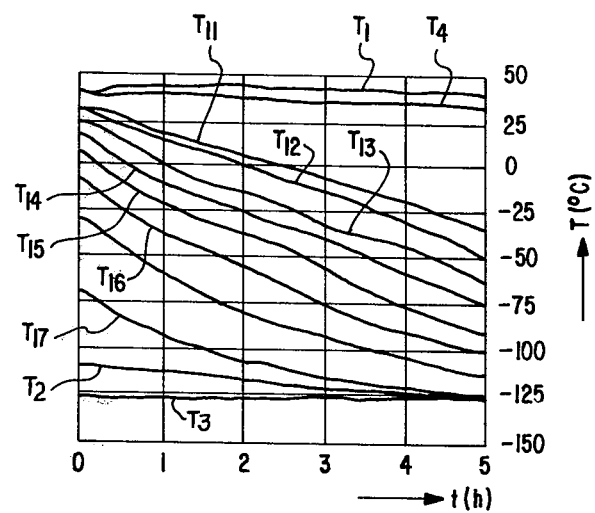

FIG. 2a shows the time curve of the temperatures at the various points indicated in FIG. 1a, in the separator apparatus during the same separation operation which is performed with controlled deformation of the temperature profile in accordance with a typical embodiment of the present invention. The temperature $T_3$ is $-126°$ C.

Figure 2B:
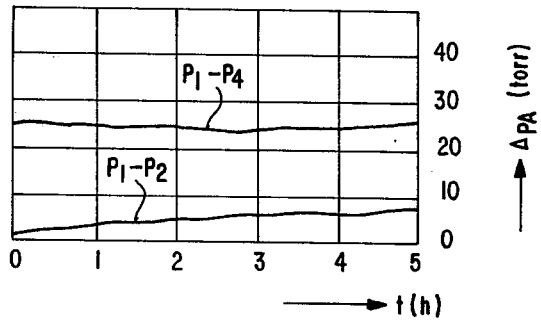

FIG. 2b shows two time curves for the differential pressure $\Delta P_A = P_1 - P_2$ in the separator passage and the differential pressure $\Delta P_A = P_1 - P_4$ of the total system, during the same separation operation as represented by FIG. 1 to 2a and which is performed with controlled deformation of the temperature profile.

Figure 3A:
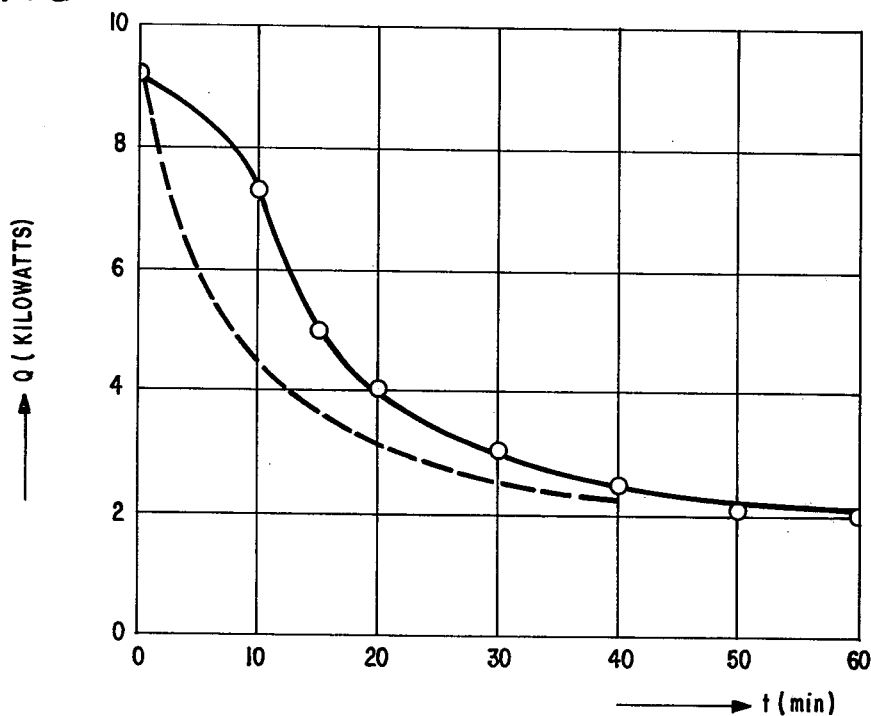

FIG. 3a shows, in full line, the cooling energy "Q" as a function of time t within the initial cooling period before starting a typical separation process performed according to the present invention wherein the initial cooling period is 60 minutes and the cooling energy during the initial cooling is supplied by a separate final cooler and is transferred to the experimental separator block by a stream of hydrogen of 9.5 kMol/h (indirect cooling process).

Figure 3B:
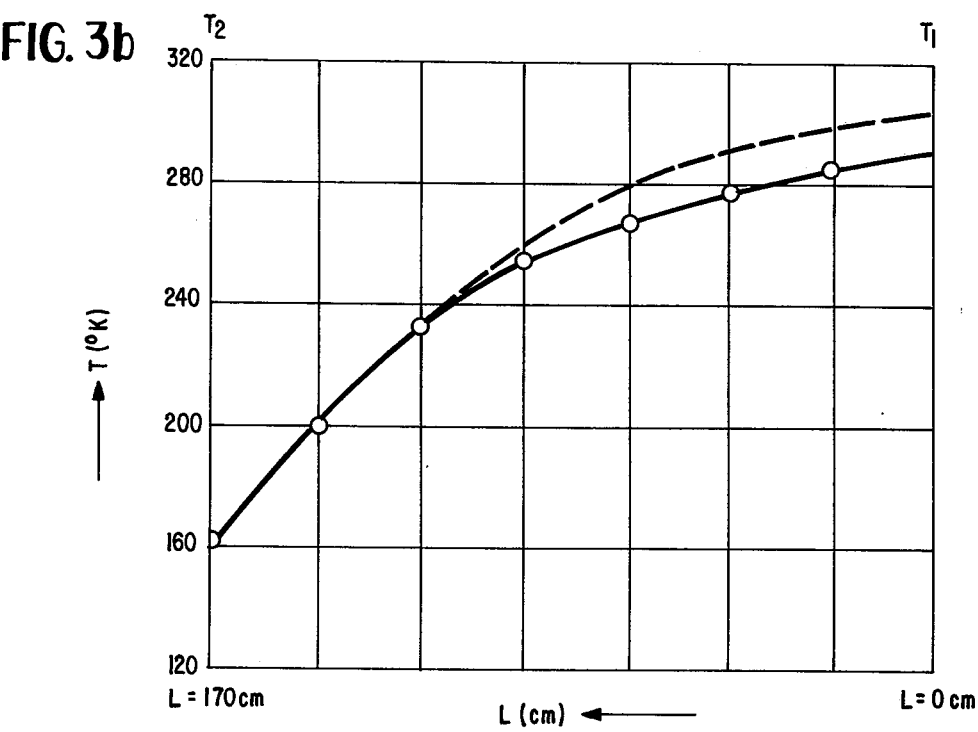

FIG. 3b shows, in full line, the measured temperature profile as a function of the length of the separator block at the beginning of the separation process, obtained during the initial hydrogen cooling cycle shown in FIG. 3a.

Figure 4:
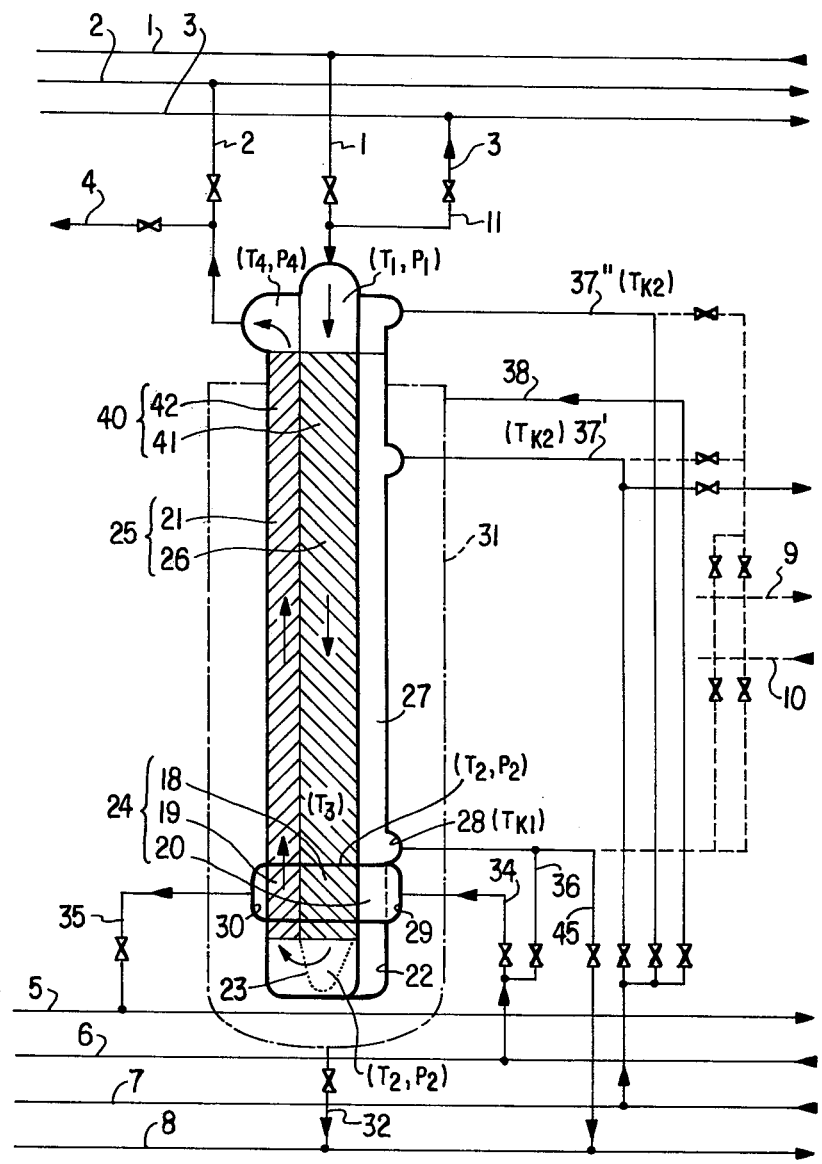

FIG. 4 shows a schematic view of one embodiment of a separator heat exchanger apparatus according to the present invention.

Figure 5:
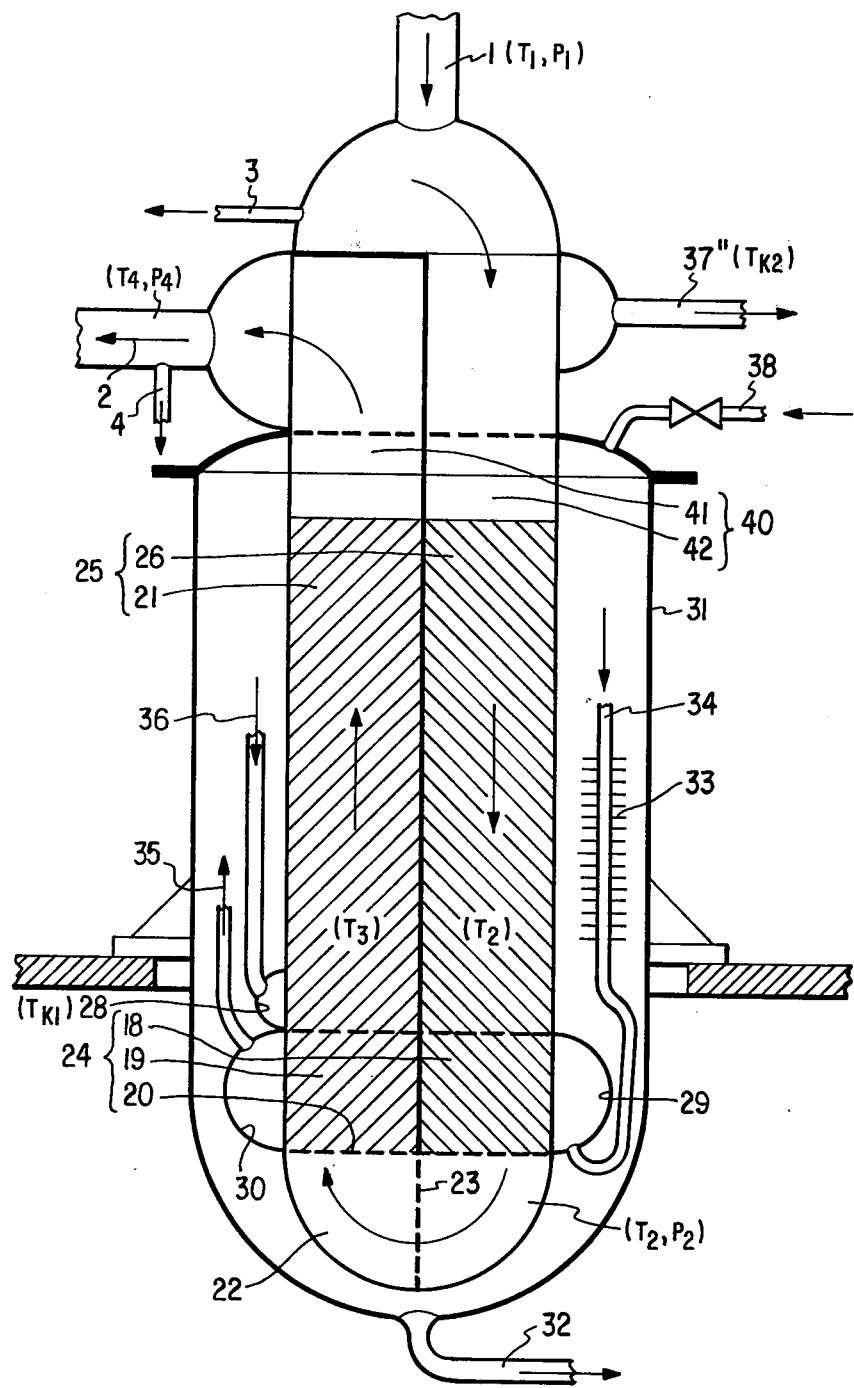

FIG. 5 shows a front elevational view of the same basic embodiment of a separator heat exchanger apparatus according to the present invention.

DETAILED DESCRIPTION OF THE PRESENT INVENTION

The present invention is based on the surprising realization that a desublimer-1 separator can be operated during a separating operation with changing temperature gradients and changing driving temperature differences and that this mode of operation can be varied within wide limits even with mixtures having a great tendency to supersaturate, which are of particular interest in practice, without a reduction in the separating efficiency as a result of condensation in the gaseous phase and snow formation.

Experimental tests with almost stationary temperature distribution have shown that a mode of operation with an constant temperature gradient for the separator and a shift of such linear temperature profile toward lower temperatures does not permit favorable charging of the separator. However, experiments with nonstationary temperature gradients as have been implemented by a nonstationary temperature established between two fixed process temperatures in accordance with the present invention have shown that a very high charging capacity can be realized with low pressure losses in an intentionally unilaterally cooled separator which e.g. receives constant additional cooling energy during the separating operation.

If, as in the case of a $UF_6$ mixture, supersaturation occurs during the separation process and if—as has been demonstrated in experiments—no snow formation occurs in the core of the stream during any conceivable modes of separator operation and in spite of high supersaturation, the separation can be divided into two steps:

1. The predominant portion of the desublimate is deposed in the separator passage itself in an optimum manner with respect to high capacity and low pressure losses without consideration of the residual content of the supersaturated component in the processed gas.

2. Thereafter, the reduction or elimination of the supersaturation is effected in a flow area at the final temperature and having sufficiently short diffusion lengths, thus achieving a fine separation according to the separation pressure at this temperature.

In order to realize pressure losses $\Delta P_A$ which are as low as possible with a high charging capacity in the separator passage, a profile of desublimating component is produced in the process of the present invention which is distinguished by a uniform reduction of the cross-section of the separator passage over as long a length of the separator block as possible. The optimum layer profile or the remaining free cross section may here be selected, either with respect to a constant pressure loss per unit length or a constant flow speed of the process gas, so that acceleration and deceleration phenomena in the separator passage are avoided. In order to fully utilize this basic optimization rule, it is necessary to consider the change in density and viscosity of the process gas as a result of changes in temperature along the separator passage, and to achieve a correspondingly controlled shift in the dew point, and with it of the entire profile of the desublimed component, toward the warm end of the separator during the separator operation.

This desired optimum manner to deposit the desublimate within the separator passage is achieved according to the present invention by exactly controlling the formation of the desublimate layer during the separation process by controlled supply of cooling energy to achieve a nonstationary temperature profile in between fixed process temperatures ($T_1$ and $T_3$) which makes the dew point shift with the chosen speed from a position near the cold end in the direction to the warmer end. Preferably, this timing of the temperature profile is obtained by means of a controlled additional or auxiliary process stream flowing in a passage adjacent to and thermally associated with the separator passage and the pure gas passage.

Experiments have shown that a technically particularly simple mode of operation results, which is very effective with respect to charging capacity and resulting pressure losses, if during separating operations a controlled cooling energy $Q_A$ is fed to the separator system, which cooling energy goes beyond the sum of the cooling requirement needed to remove the desublimation heat $Q_D$ and the cooling requirement needed to cover temperature losses which occur in the system due to such factors as insulation losses. The use of such a controlled cooling energy $Q_A$ results in the desired continuous shift of the dew point and of the desublimated profile as it is shown in FIGS. 1 and 2, which show the measured results from a typical separation experiment. In this way, it is possible to limit the rise in the differential pressure $\Delta P_A = P_1 - P_2$ in the separator passage during the entire separating process by about 7 Torr with a charge of about 50% of the available separator volume; where $P_1$ is the pressure at the warmer end and $P_2$ is the pressure at the cold end of the separator passage. This rise is compensated by a reduction in the differential pressures produced in the remaining passages of the separator system which are free of $UF_6$ as a result of changes in density and viscosity due to the lowering of the temperature during the separation process. This means, as shown in FIG. 2b in the difference between the entrance pressure and the exit pressure $P_1 - P_4$ over the entire separator system, that with this type of control of the separation process, there results practically no rise in the differential pressure $\Delta P = P_1 - P_4$ over the entire separator system.

Since with the practiced nonstationary mode of operation of the separator, the temperatures of the gas streams in the separator system are changing continuously, prior calculation of the required cooling energy necessitates measurement or computation, respectively, of all quantities of heat fed to and removed from the separator system. From the energy balance determined by those values, the additional cooling energy required in the cooling stream to produce the desired continuous drop in the temperature profile in the separator is calculated. For routinely repeated separator operations as performed in industrial service, an optimum time sequence of the cooling energy requirement can be determined once, and this optimum time sequence then can be used for technical operation of the separator system.

With a separator which is well-insulated in a known manner, insulation losses need not be considered. In that case, the total cooling energy $Q_{total}$ required to be introduced into the separator is then a combination of (1) the desublimation heat energy $Q_D$ to be dissipated and (2) the cooling energy $Q_A$ which is identified as the excess cooling energy and which serves to continuously lower the temperature in the separator block. The desublimation heat energy $Q_D$ is proportional to the flow rate of the component to be separated, i.e., to the product of the total flowrate "$\dot{m}$" and the concentration "N" of the component to be separated. Likewise, the cooling energy $Q_A$ is proportional to this product, i.e., to the concentration N of the component to be separated and the total flow intensity "$\dot{m}$", so that with equal quantities separated the same temperature state will always result in the separator. This assures that with changing contents of the component to be separated in the raw process gas, the same final state of charge is attained in the full separator. The total cooling energy results from the following equation:

$$Q_{total} = K_A \cdot \dot{m} \cdot N \tag{1}$$

During separator operation, the temperatures $T_1$ and $T_4$ at the warm end of the precooler remain practically constant and generally no cooling energy is supplied in this portion of the apparatus. A portion of the total cooling energy, however, is fed to the cold end of the separator system through the process gas stream $\dot{m}$. The process gas stream at the cold end of the separator has a temperature $T_2$ as it emerges from the separator passage and is then further cooled in a final cooling passage to a colder temperature $T_3$ which is the lowest temperature produced in the separator apparatus. The amount of cooling energy introduced at the cold end is referred to as $Q_{mainstream}$ and is proportional to the flow intensity of the process gas and the temperature difference $\Delta T$ which is created at the cold end between the temperature $T_2$ at the end of the separator passage and the temperature $T_3$ in the final cooler passage. Thus, $$Q_{mainstream} = \dot{m} \cdot c_p \cdot \Delta T \tag{2}$$

where $\Delta T = T_2 - T_3$.

The rest of the required total cooling energy must be supplied through an additional auxiliary cooling stream in a third passage of the separator. The auxiliary cooling stream has a cold entrance temperature $T_{K1}$, and a warmer exit temperature $T_{K2}$. This auxiliary cooling stream generally is introduced at the lowest separator temperature $T_3$. The cooling energy supplied through the auxiliary cooling stream is referred to as $Q_K$, and can be regulated by a change in the flow rate $\dot{m}_K$ of the auxiliary cooling stream under consideration of the difference $\Delta T_K$ between its exit temperature $T_{K2}$ and its entrance temperature $T_{K1}$ according to equation (3)

$$Q_K = \dot{m}_K \cdot c_{p,K} \cdot \Delta T_K \tag{3}$$

The required auxiliary cooling energy $Q_K$ is also given according to equation (4) as follows:

$$Q_K = Q_{total} - Q_{mainstream} \tag{4}$$

The required auxiliary cooling flow rate $\dot{m}_K$ can then be calculated from the required auxiliary cooling energy $Q_K = Q_{total} - Q_{mainstream}$.

Thus, by introducing equations (1), (2) and (3) into equation (4), and solving for $\dot{m}_K$, it is possible to determine the additional cooling flow rate $\dot{m}_K$ required for the desired cooling speed of the separator according to equation (5) as follows:

$$\dot{m}_K = (K_A \cdot \dot{m} \cdot N - \dot{m} \cdot c_p \cdot \Delta T)/(c_{p,K} \cdot \Delta T_K) \tag{5}$$

where $\dot{m}$ is the measured values for the total throughput of the process gas stream, $\Delta T$ is the temperature difference in the process gas at the cold end of the separator, N is the concentration in the process gas of the component to be separated at the entrance, and $\Delta T_K$ is the temperature difference of the auxiliary cooling stream. The constant $K_A$ determines the desired cooling speed of the separator and is thus determinative for the thickness of the deposed layer of the desublimated component. In the course of experiments, this parameter $K_A$ has been optimized with a view toward reaching a compromise between maximum separator capacity and low pressure losses. A favorable compromise is a maximum charge of the given separator up to 50% of the separator volume with a total pressure drop at the separator passage of $\Delta P_A = 7$ Torr, as is shown in the typical experimental embodiment of the FIGS. 1 and 2. This value for constant $K_A$, once determined, is given for the calculation of the intensity of the auxiliary stream $\dot{m}_K$. In separation experiments controlled only by this kind of direct flow regulation of $\dot{m}_K$, tests were made with variations of the $UF_6$ concentration in the raw gas within a range from N=0.1% to 0.5%, and operating pressures in a range from 100 to 300 Torr. Although the separating times in these cases were inversely proportional to the $UF_6$ intake in a range from 3 to 15 hours, the separation profile was always practically the same.

The initial temperature profile used at the start of the separation process can be obtained favorably by a direct cooling process using a heat exchanger which is integrated in the separator block. In the separation operation this final cooler transfers cooling energy into the gas stream within the final cooler passages, but to establish the initial temperature profile the initial cooling energy is transferred from this final cooler part into the separator block directly by heat conduction through the metallic parts of the block, with no process gas flowing through the separator.

The method also can make use of a separate final cooler without direct metallic contact to the separator block. Then the initial cooling energy will be transferred from the final cooler into the separator block by a stream of inert process gas flowing through both parts (as for the separation operation). Reference to this kind of establishing the initial temperature profile is made as "indirect" cooling process. As no further detailed description is needed for this particular embodiment, it is shown however, that this indirect cooling method furnishes a starting cooling energy of similar magnitude and just as favorable temperature profiles for the start as the direct cooling process. This can be seen in the comparisons shown in FIGS. 3a and 3b. FIG. 3a shows in full line, the cooling energy "Q" as a function of the initial cooling time "t" for a typical separation experiment performed according to the present invention wherein the initial cooling period is 60 minutes and the cooling energy during initial cooling of the experimental separator block is supplied by a stream of hydrogen of 9.5 kMol/h. As a comparison, the dashed line shows calculated results for direct cooling using an integrated cross-current heat exchanger used in separation operation for cooling the final cooler passage which transfers cooling energy purely by nonstationary heat conduction along the same separator block applying a constant cooling temperature $T_{K1} \approx -110°$ C. FIG. 3b shows, in full line, the measured temperature profile after 60 minutes at the beginning of the separation process obtained during the initial hydrogen cooling cycle shown in full line in FIG. 3a. As a comparison, the dashed line in FIG. 3b shows the calculated temperature profile purely obtained in the same time by direct cooling by means of longitudinal heat conduction in the separator block. Cooling starts from room temperature in both cases. In addition to both forementioned initial cooling procedures, use can be made of the auxiliary heat exchanger passage to favorably influence the initial temperature profile. This can be done as well as to influence the temperature profile during the separation operations in the desired manner by controlling the composition and/or the direction and/or the flowrate of the auxiliary process stream carried in this passage.

In the process of the present invention, after the desired layer thickness profile of the desublimate is obtained in the separator passage, the process gas stream is cut off so that it no longer flows into the heat exchanger apparatus. The heat exchanger apparatus is then heated to discharge the desublimate from it. During this heating, the desublimate is heated to a temperature which causes the desublimate to change to its liquid or vapor state and can then be removed from the heat exchanger in the liquid or vapor state. The heating of the heat exchanger can be performed, for example, by passing a heating medium through the auxiliary passage of the heat exchanger. In one embodiment of the present invention, the heat exchanger separator is disposed in a pressure vessel, and the pressure vessel can be supplied with heat transfer medium (e.g. steam) to provide further heat imput for discharge of the desublimate.

After the desublimate is discharged, the separator is warm and empty, and can now be cooled again in the manner discussed previously to obtain a starting temperature profile for a further separation cycle.

Turning now to the drawings, there is shown in FIG. 4 a countercurrent heat exchanger in the form of a heat exchanger block 25 which is mounted in a pressure vessel 31 (shown in broken line). Heat exchanger block 25 includes a raw gas separator passage 26 and a pure gas passage 21 which is in countercurrent relationship to separator passage 26 and which communicates with separator passage 26 at their lower ends via a final cooler portion 24. The lower ends of separator passage 26 and pure gas passage 21 are their cold ends. Heat exchanger block 25, in the case of UF$_6$ separation, is provided with multi-entry fins (not shown) (fin height 11.8 mm; serrated; 10 fins per inch with a fin thickness of 0.2 mm) over the entire length of separator passage 26. Pure gas passage 21 has smooth fins (not shown) over its entire length and does not require a distributor at its cold end.

The heat exchanger block 25 further includes a pre-cooling portion 40 which is at the top of block 25. Pre-cooling portion 40 contains a segment 41 which communicates with separator passage 26 and a segment 42 which communicates with pure gas passage 21. Pre-cooling portion 40 and the actual separator portion below it are combined to form a homogeneous compact heat exchanger block 25.

The heat exchanger apparatus further includes at least one auxiliary flow passage 27 which is in heat exchange relation with separator passage 26, but does not communicate therewith. Auxiliary flow passage 27 can extend the full length of separator passage 26 or a portion thereof. As shown in the embodiment of FIG. 4, auxiliary flow passage 27 extends substantially the entire length of separator passage 26. Auxiliary passage 27 can function as an auxiliary cooling passage for supplying the needed auxiliary cooling energy $Q_K$ to the separator system. In addition, auxiliary passage 27 can serve further as a heating passage to heat the separator during the emptying operation where the desublimate is removed from the separator. When auxiliary passage 27 functions as an auxiliary coolant passage, the coolant enters passage 27 at its lower end via an auxiliary cooling stream entrance 28 at a temperature $T_{K1}$ and leaves via lines 37' or 37" at its upper end at a temperature $T_{K2}$.

Raw process gas, which contains the desublimatable component, enters the heat exchanger at its top without use of a distributor (full end tank) from a process gas inlet line 1 which is connected with pre-cooling segment 41. Pure process gas from which the desublimatable component has been removed leaves the heat exchanger during the separation process via a gas outlet line 2 which is connected with pre-cooling segment 42. When the separator becomes fully charged, the process gas inlet line 1 is cut off, and any remaining inert gas is evacuated through pure gas passage 21 and an evacuation line 4 so as not to unnecessarily remove desublimate. After evacuation of any remaining non-condensable gas is complete, the heat exchanger is heated to evaporate the desublimate. The evaporated desublimate leaves the heat exchanger by flowing through separator passage 26 to an outlet gas line 11 which is connected on one end to a desublimate discharge line 3 and on its other end to raw gas inlet. This arrangement of the outlet gas line 11 and desublimate discharge line 3 prevents backflow of the desublimate through non-tight valves of the discharge line 3 to the pure gas side of the separator apparatus. As can be seen in FIG. 4, valves are provided to control flow in gas lines 1, 2, 3, 4, and 11 and all of these valves are located at the warm end of the separator, and thus these valves do not have to be in the form of low temperature valves. Further, all of these valves which control flow in gas lines 1, 2, 3, 4 and 11 do not have to meet high tightness requirements.

As shown in FIG. 4, a filter 23 in the form of an integrated wire mesh is provided downstream of separator passage 26 in a lower end tank portion 22 of the separator, and the gas coming from separator passage 26 flows through filter 23 and thereafter enters into the full cross section of pure gas passage 21. Crystallites of the desublimate which are carried along by the gas stream may be collected in filter 23. According to previous operating experience, a suitably chosen filter 23 provides sufficiently short diffusion paths to eliminate practically the prevailing supersaturation of the mixture. Actually, the filter 23 need only be capable of retaining a maximum of 1 part per thousand of the separated UF$_6$ quantity. Therefore, only a small filter surface and minimum filter volume are required which can be integrated in a simple manner.

In the final cooler 24, a passage 18 is connected to the separator passage 26, a passage 19 to the pure gas passage 21. Passages 18 and 19 are cooled by flow of a heat transfer medium flowing in a third passage 20. In this embodiment, the heat exchanger 24 is integrated in block 25 and is provided with side tanks 29 and 30. The passage requirement for the cooling heat exchanger preferably is selected to be identical with the number of auxiliary passages 27. This will result in only relatively small side tanks 29 and 30 at the cold end of the separator apparatus for the coolant supply needed for cooling final cooler passages 18 and 19.

Cooling of the warm, empty separator is effected with the aid of the final cooler 24 which is charged with a liquid coolant (e.g., refrigerant 12, i.e., $CCl_2F_2$). The coolant is disposed in a closed circuit formed by a coolant suply line 6 and a coolant outlet line 5, under the respective vapor pressure, given by the highest occurring temperature, e.g., 10 atmospheres absolute for $T_{max} = 40°$ C. The coolant is introduced into side tank 29 of the final cooler 24 from coolant supply line 6 through a coolant inlet line 34 and discharged from side tank 30 of the final cooler 24 through a discharge line 35 to coolant out line 5.

In one embodiment of the present invention, the coolant supplied to the final cooler 24 which is used to cool final passages 18 and 19 may advantageously also be supplied to auxiliary passage 27 as a liquid auxiliary cooling stream, since it would in any case be at the separator temperature $T_3$ when it is introduced into auxiliary passage 27 at entrance 28. The coolant is supplied from coolant supply line 6 to entrance 28 of auxiliary passage 27 through a line 36 which branches off from line 34. In this embodiment of the invention, the coolant circuit for cooling the final cooler passage 24 and that for the auxiliary passage are, in part, portions of the same circuit.

In another embodiment of the present invention, the coolant circuit for cooling the final cooler passage 24 and that for the auxiliary cooling passage 27 are completely separated from each other. A particular reason for the use of separate coolant circuits is given if a two-phase mixture of a suitable coolant is introduced into auxiliary passage 27 for cooling in order to produce a specially shaped temperature profile in separator block 25.

If the auxiliary cooling stream supplied to auxiliary passage 27 is to be regulated completely decoupled from the cooling circuit used to cool final cooler passage 24, the line connections 9 and 10 shown in dashed lines in FIG. 4 are applicable if the coolant from the heating system also is not to be used.

To empty the separator after it becomes charged with desublimate, heat energy must be supplied to the separator. Heat energy can be supplied to the apparatus by passing a warm gaseous coolant through auxiliary passage 27. The warm gaseous coolant enters the top of auxiliary passage 27 through a line 37' or a line 37". Lines 37' and 37" are supplied with warm gaseous coolant from a heating vapor line 7. In addition, heating energy can be supplied to the separator through pressure vessel 31 which acts as a heat jacket which surrounds heat exchanger block 25. Thus, warm gaseous coolant from heating vapor line 7 can be passed into the top of pressure vessel 31 through an inlet line 38 to provide jacket heating of the separator. The warm gaseous coolant which enters inlet line 38 and line 37' or line 37" can be steam. As the warm gaseous coolant passes through pressure vessel 31 and auxiliary passage 27, it condenses to its liquid state. A condensate discharge 32 is located at the bottom of pressure vessel 31 and feeds into a condensate outlet line 8. Similarly, condensate can be discharged from auxiliary passage 27 through a discharge line 45 which feeds into condensate outlet line 8.

Heating and discharging of the desublimate by charging auxiliary passage 27 and pressure vessel 31 with warm, gaseous coolant through lines 37' or 37" and 38 from heating vapor line 7, with controlled discharge of the condensate through condensate discharge lines 32 and 45 and condensate outlet line 8, produces rapid heating of the desublimate to the desired temperature level, and proper intake of the required evaporation heat is assured, to points where evaporation of the desublimate takes place.

An optimum solution for providing cooling energy to cool final cooler 24, for providing cooling energy to auxiliary passage 27, and for providing heat energy to auxiliary passage 27 during heating, is the use of a single heat transfer medium for all three objectives. This should be possible with low maximum system pressures (about 1 atmosphere absolute) if instead of the conventional cooling media (freon), there is used butane or pentane or similar low-boiling-point substances which are liquid at the final separator pressure under very low gas pressures.

Turning now to FIG. 5, there is shown an embodiment of a separator apparatus which is similar to that shown in FIG. 4, and where the same reference numerals as in FIG. 4 are used to indicate like parts. Auxiliary passage 27 is not shown in FIG. 5, but line 36 for supplying a cooling liquid auxiliary stream and entrance 28 to auxiliary passage 27 are shown in FIG. 5. In view of the extremely compact configuration of the separator, jacket heating of it and the connected lines can be effected during emptying of the separator by a combination of steam heat and vacuum insulation as shown in FIG. 5. The part of the separator block 25 disposed below the process connections (e.g., 40° C.) is suspended in pressure vessel 31 which receives warm gaseous coolant through line 38 as heating means. In addition, warm gaseous coolant is introduced into auxiliary passage 27 to effect heating. The temperature of the warm gaseous coolant introduced through line 38 is regulated above the condensation point of the warm gaseous coolant by maintaining a suitable pressure in pressure vessel 31, and any steam condensate which may form flows out at the bottom of pressure vessel 31 through condensate discharge 32. When the heating period is terminated, line 38 is closed to prevent further quantities of warm gaseous coolant from entering pressure vessel 38, but there is a quantity of warm gaseous coolant which then remains in pressure vessel 31. During the cooling period which follows heating and emptying of the separator, the warm gaseous coolant remaining in pressure vessel 31 after blocking off of pressure vessel 31 is frozen out on condenser surfaces 33 which are provided on cooler inlet line 34. For this purpose, a coolant fluid is required which has a vapor pressure less than $10^{-3}$ Torr at the separator temperature.

In the method of the present invention, the controllable change of the nonstationary temperature profile, together with a likewise controllable displacement speed of the dew point, produce a layer thickness profile of the desublimate along the surfaces of the separator with which there preferably is realized an optimized ratio of maximum charging quantity to occurring pressure decrease $(P_1 - P_4)$ at the end of the charging step. During the separation process, the temperature $T_2$ at the cold end of the separator is kept at values which are necessary for the degree of purity of the remaining gas mixture or for the degree of separation of the desublimate. Supersaturations of the component to be desublimated occurring in gas mixtures having a tendency to supersaturate can be almost isothermally reduced in flow regions specially provided for this purpose and having sufficiently short diffusion paths in the range of the final separator temperature ($T_2$, $T_3$). The temperature profile before the onset of the separation process preferably is shaped with the use of an auxiliary cooling stream which is fixed in time according to quantity, temperature, composition and direction of flow and which is conducted over the entire length of the separator or parts thereof in auxiliary passage 27. On the other hand, the controllable change in the temperature profile and the controllable displacement speed of the dew point along the surfaces of the separator during the actual separation process can be controlled with the aid of an auxiliary cooling stream which can be regulated in time with respect to quantity, temperature and composition and which flows in auxiliary passage 27 over the entire length of the separator (L) or parts thereof. The quantity, temperature and composition of the auxiliary cooling stream can be controlled under consideration of the momentary heat flow balance of the heat exchanger separator 25 in such a manner that a predetermined excess cooling energy is introduced in such quantities that the desired cooling periods for warmer portions of the separator and the desired displacement speeds of the dew point result therefrom. The auxiliary cooling stream can be a stream of inert gas, or can consist of a liquid heat transfer medium, or can be a two-phase mixture with a measured quantity of liquid component.

The desired layer thickness profile in all sections of the charged raw gas separator passage 26 preferably is determined as an optimized function of the local flow speed, the local density and the local Reynolds number Re of the process gas mixture with utilization of the effective hydraulic diameter of the separator passage 26 as it results from the free cross section at full charge. Preferably, the optimized layer thickness profile produces a constant value for the specific pressure reduction $dp/dL$ along the charging length of separator passage 26, or a constant average flow energy along separator passage 26. The excess cooling energy introduced into the separator 25 can be programmed dynamically on the basis of the momentary heat flow balance and the given values for the concentration and flow intensity under consideration of the momentary values of concentration and flow intensity of the desublimatable mixture component of the gas mixture, the actually-realized charging state and the already-occurred pressure reduction.

Upon completion of the separation process, any remaining pure gas is evacuated to line 4 through pure gas passage 21 and the charged separator is then heated with the aid of an auxiliary heating stream in auxiliary passage 27 to empty the separator of the charged desublimate. The auxiliary heating stream can be an inert gas, or a condensable heat transfer medium, or a liquid heat transfer medium. Together with the heating process that results from the use of an auxiliary heating stream, a heat transfer medium can be introduced into pressure vessel 31 through line 38 so as to externally heat the separator and its connecting lines to aid in emptying the separator of the charged desublimate. The auxiliary heating stream can be regulated in time according to flow intensity and direction by conducting it over the entire length of auxiliary passage 27 or parts thereof so as to provide heat transfer. The desublimate can be discharged from the heated separator 25 by evaporation under pressures which lie below the pressure $P_4$ of the process gas which leaves through line 4. Emptying of separator 25 can be effected by extracting the desublimate in the form of a gaseous phase or as a liquid phase, after the triple point conditions have been exceeded. During emptying of the separator 25 under high internal pressure, pressure vessel 31 assumes a protective function against discharge of desublimate.

In the apparatus of the present invention, the auxiliary passage 27 is provided with taps or openings to which various lines are connected for supplying cooling or heating streams to auxiliary passage 27. The heat exchanger 25 preferably is a compact heat exchanger and contains a final cooler 24 which is integrated in the heat exchanger. In addition, a filter can be integrated in the heat exchanger block.

The portion of the heat exchanger where the actual separation takes place preferably is built into a pressure vessel 31 and preferably is fixed to the cover of the pressure vessel 31 at its upper part and is freely suspended at the lower part. Preferably, all process valves, i.e., those valves which control the flow of the raw process gas, the pure gas and the evaporated desublimate, are disposed outside pressure vessel 31. Pressure vessel 31 can be evacuated so as to provide heat insulation. Further, pressure vessel 31 can be charged with an inert or a condensable heat transfer medium to heat the separator. When a condensable heat transfer medium is used in pressure vessel 31, after the heating operation is completed, any remaining condensable heat transfer medium which remains in the pressure vessel can be frozen out on a ribbed surface 33 of a suitable line that is in pressure vessel 31. This suitable line can be coolant inlet line 34 through which coolant is supplied to cool the final cooler passage 24. The number of auxiliary passages 27 preferably is identical with the number of passages of the integrated crosscurrent heat exchanger used to cool final cooler passage 24.

The process gas separator passage 26 for the raw gas preferably is provided with high ribs of short length with small spacing between ribs in the direction of flow. The length and design of the countercurrent passages 21 and 26 preferably are selected so that with constant gas throughput, the reduction in pressure loss occurring in the empty separator between the temperature distribution at the start of the separating process and the temperature distribution at the end of the separation is equal to the increase in pressure losses from charging of the separator. Suitable design of the ribs in the final cooler passage 24 produces flow regions with sufficiently short diffusion paths in which possibly occurring supersaturation is reduced.

It will be understood that the above description of the present invention is susceptible to various modifications, changes and adaptations, and the same are intended to be comprehended within the meaning and range of equivalents of the appended claims.

FIG. 5  U.S. Patent No. 4,181,508
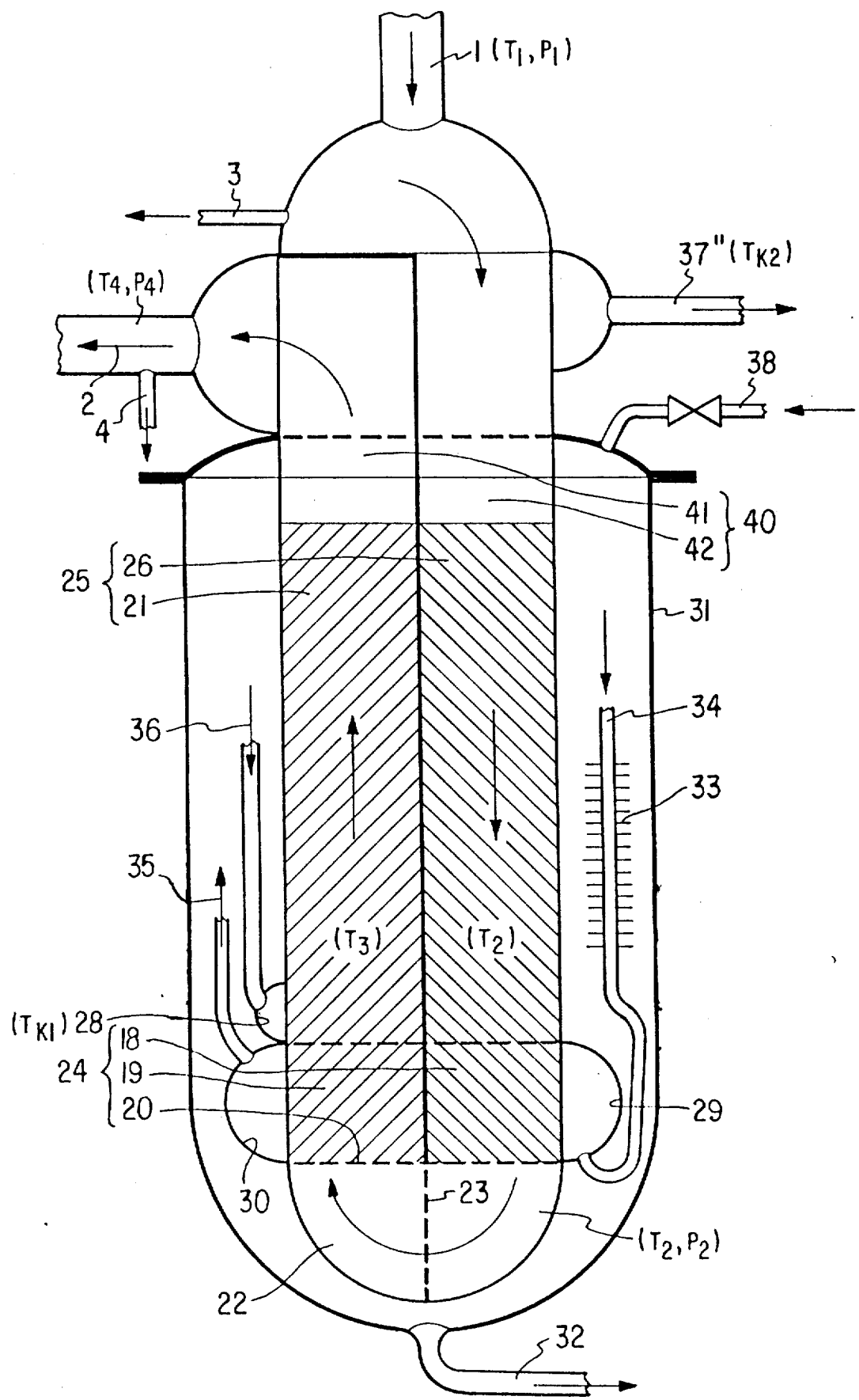

What is claimed is:

1. Method for separating a desublimatable component from a raw gas mixture containing a non-condensable gas onto the surface of a heat exchanger apparatus having a heat exchanger separator containing a separator passage, said separator having a cold end and a warmer end, comprising: creating a desired starting temperature profile in the heat exchanger separator, flowing the gas mixture through the separator from the warmer end toward the cold end to produce a desired layer thickness profile of desublimate on the surface in the heat exchanger separator in a direction opposite the direction of flow of the gas mixture by providing a nonstationary temperature distribution profile in the heat exchanger separator to shift the position of the dew point at a controlled speed from a given point near or at the cold end of the heat exchanger separator at the beginning of the separation process to the warmer end of the separator and thereby build up the desired layer thickness profile and charge the separator with the desublimate, controlling changes in the nonstationary temperature profile and thereby controlling the displacement speed of the dew point along the surface of the separator by supplying additional cooling energy to the separator, the additional cooling energy being regulated in time and regulated to produce a constant final temperature in the separator to achieve a desired purity for the non-condensable gas or to achieve a desired degree of separation of the desublimate, terminating the flow of the gas mixture into the separator after full charging of the separator, then evacuating any remaining non-condensable gas in the separator, and thereafter recovering the desublimate by heating up the separator and exhausting the desublimate.

2. Method as defined in claim 1, wherein the changes in the nonstationary temperature profile and the displacement speed of the dew point are controlled to produce a layer thickness profile of the desublimate along the surfaces of the separator with which there is obtained at the end of the charging step an optimized ratio of maximum charging quantity to occurring pressure drop over the entire heat exchanger apparatus.

3. Method as defined in claim 1, comprising isothermally reducing any occurring supersaturation by flowing the gas mixture through a flow region located in the cold end of the separator having sufficiently short diffusion paths if the gas mixture has a tendency to supersaturate with respect to the component to be desublimated.

4. Method as defined in claim 1, wherein the temperature profile before the onset of the separation process is shaped with the use of an auxiliary cooling stream which is fixed in time according to quantity, temperature, composition and direction of flow and which is conducted over at least a portion of the entire length of the separator in an auxiliary passage.

5. Method as defined in claim 4, wherein the auxiliary cooling stream is conducted over the entire length of the separator.

6. Method as defined in claim 4 wherein the auxiliary cooling stream is a stream of inert gas.

7. Method as defined in claim 4, wherein the auxiliary cooling stream consists of a liquid heat transfer medium.

8. Method as defined in claim 4 wherein the auxiliary cooling stream is a two-phase mixture with a controlled quantity of liquid component.

9. Method as defined in claim 1, wherein the controllable changes in the temperature profile and the controllable displacement speed of the dew point along the surface of the separator is controlled with the aid of an auxiliary cooling stream which is regulated in time with respect to quantity, temperature and composition and which flows in an auxiliary passage over at least a portion of the entire length of the separator passage.

10. Method as defined in claim 9 wherein the auxiliary stream is conducted over the entire length of the separator.

11. Method as defined in claim 9, wherein the quantity, temperature and composition of the auxiliary cooling stream is controlled under consideration of the momentary heat flow balance of the heat exchanger separator in such a manner that a predetermined excess cooling energy is introduced in such quantities that the desired cooling periods for warmer portions of the separator and the desired displacement speeds of the dew point result therefrom.

12. Method as defined in claim 9, wherein the auxiliary cooling stream is a stream of inert gas.

13. Method as defined in claim 9, wherein the auxiliary cooling stream consists of a liquid heat transfer medium.

14. Method as defined in claim 9, wherein the auxiliary cooling stream is a two-phase mixture with a controlled quantity of liquid component.

15. Method as defined in claim 1, wherein the layer thickness profile in all sections of the charged separator passage is determined as an optimized function of the local flow speed, the local density and the local Reynolds number (Re) of the raw gas mixture with utilization of the effective hydraulic diameter of the separator passage as it results from the free cross section of the separator passage at full charge.

16. Method as defined in claim 1, comprising controlling the build-up of the desired layer thickness profile to produce a constant value for the specific pressure reduction $dp/dL$ along the charging length of the separator passage.

17. Method as defined in claim 1, comprising controlling the build-up of the desired layer thickness profile to produce a constant average flow energy along the separator passage.

18. Method as defined in claim 1, wherein the additional cooling energy introduced into the separator to bring about the shift in dew point is controlled dynamically on the basis of the momentary heat flow balance and the given values for the concentration and flow intensity under consideration of the momentary values of concentration and flow rate of the desublimatable component of the gas mixture, considering actually realized charging state, and the already occurred pressure reduction.

19. Method as defined in claim 1, wherein upon completion of the separation process, the heat exchanger is evacuated to remove any remaining gas, and the separator is then heated with the aid of an auxiliary heating stream in the auxiliary passage to empty the separator of the charged desublimate.

20. Method as defined in claim 19, wherein the auxiliary heating stream is an inert gas.

21. Method as defined in claim 19, wherein a condensable heat transfer medium is used as the auxiliary heating stream.

22. Method as defined in claim 19 wherein the auxiliary heating stream is a liquid heat transfer medium.

23. Method as defined in claim 19, wherein the heat exchanger is mounted in a pressure vessel, and a heat transfer medium is introduced into the pressure vessel to externally heat the separator and its connecting lines to aid in emptying the separator of the charged desublimate.

24. Method as defined in claim 19, wherein the auxiliary heating stream is regulated in time according to flow intensity and direction by conducting it over at least a portion of the length of the auxiliary passage so as to provide heat transfer.

25. Method as defined in claim 24, wherein the auxiliary heating stream is conducted over the entire length of the auxiliary passage.

26. Method as defined in claim 19 wherein the desublimate is discharged from the heated separator by evaporation under a pressure which lies below the pressure which exists in the heat exchanger at the point where the pure gas leaves the heat exchanger during separation operation.

27. Method as defined in claim 19, wherein emptying of the separator after the triple point conditions of the desublimate have been exceeded is effected by extraction of the desublimate in the form of a liquid phase.

28. Method as defined in claim 19, wherein emptying of the separator after the triple point conditions of the desublimate have been exceeded is effected by the extraction of the desublimate in the form of a gaseous phase.

29. Method as defined in claim 19, wherein the heat exchanger is mounted in a pressure vessel, the separator is emptied of desublimate under high internal pressures, and the pressure vessel assumes a protective function against discharge of desublimate.

30. Apparatus for separating a desublimatable component from a gas mixture containing an inert gas in a countercurrent heat exchanger comprising:
  (a) a countercurrent heat exchanger having a raw gas separator passage in which the desublimatable component of the gas mixture desublimates, said separator passage having a first end and a second end which is to be maintained at a colder temperature than the first end;
  (b) a pure gas passage in which cooled inert gas emerging from the separator passage is reheated to its starting temperature, said pure gas passage being in the countercurrent heat exchanger and having a first end and a second end which is to be maintained at a colder temperature than the first end, said pure gas passage being parallel, in countercurrent flow and thermally connected to the separator passage;
  (c) at least one auxiliary passage through which an auxiliary stream can flow and which is thermally connected to the raw gas passage and the pure gas passage;
  (d) means for supplying cooling energy to the auxiliary passage and providing a nonstationary temperature distribution profile in the heat exchanger;
  (e) a final cooler having a passage connecting the second end of the separator passage to the second end of the pure gas passage and in which it is possible to reduce supersaturation produced in the separator passage;
  (f) a filter between the separator passage and raw gas passage for collecting crystallites of the desublimate which are carried along by the gas stream.

31. Apparatus as defined in claim 30 wherein the auxiliary passage is provided with taps to which lines are connected for supplying a heat transfer medium to the auxiliary passage.

32. Apparatus as defined in claim 30, wherein the separator heat exchanger is a plate-fin heat exchanger.

33. Apparatus as defined in claim 32, wherein the final cooler is a structural element of the plate-fin heat exchanger.

34. Apparatus as defined in claim 32 wherein the filter is positioned in the plate-fin heat exchanger.

35. Apparatus as defined in claim 33 wherein the number of auxiliary passages is identical with the number of cooling passages of the final cooler.

36. Apparatus as defined in claim 30, wherein the separator passage and pure gas passage and the auxiliary passage are arranged in thermal contact to form a compact heat exchanger block which heat exchanger block contains said filter and said final cooler.

37. Apparatus as defined in claim 30, wherein the raw gas separator passage and the pure gas passage define a desublimator which is positioned in a pressure vessel to provide thermal isolation by vacuum or for outside heating with heat transfer fluid.

38. Apparatus as defined in claim 37 wherein the desublimator is fixed to the top of the pressure vessel and is freely suspended therefrom.

39. Apparatus as defined in claim 30, wherein the length and design of the countercurrent passages are such that with constant gas throughput, the reduction in pressure drop occurring in the empty separator passage and pure gas passage between the temperature distribution at the start of the separating process and the temperature distribution at the end of the separation process is equal to the increase in pressure drop from charging of the separator passage and pure gas passage.

* * * * *

UNITED STATES PATENT AND TRADEMARK OFFICE
CERTIFICATE OF CORRECTION

PATENT NO. : 4,181,508
DATED : January 1, 1980
INVENTOR(S) : Jürgen Schmid et al It is certified that error appears in the above-identified patent and that said Letters Patent are hereby corrected as shown below:

Column 5, line 11, change "desublimer-1 separator" to --desublimer-separator--.

Change Fig. 5 of the drawing to appear as shown on the attached sheet.

Signed and Sealed this

Sixteenth Day of September 1980

[SEAL]

Attest:

SIDNEY A. DIAMOND

Attesting Officer   Commissioner of Patents and Trademarks